May 10, 1949.  E. A. SZUBA  2,469,904

GAUGE SUPPORT

Filed Jan. 10, 1947

Inventor
Edward A. Szuba
Barthel & Bugbee
Attorneys

Patented May 10, 1949

2,469,904

UNITED STATES PATENT OFFICE 2,469,904

GAUGE SUPPORT

Edward A. Szuba, Lincoln Park, Mich.

Application January 10, 1947, Serial No. 721,431

6 Claims. (Cl. 248—124)

1

This invention relates to gauges and in particular to gauge supports.

One object of this invention is to provide a gauge support which will hold a dial indicator gauge firmly and precisely yet which will provide an accurate fine adjustment for positioning the gauge in a desired location.

Another object is to provide a gauge support wherein the gauge is held by an arm which is slidable upon a vertical shaft, the latter being tiltably mounted upon a base.

Another object is to provide a gauge support as set forth in the preceding objects wherein the vertical shaft is joined to the base by a slender portion around which the shaft is tilted by an adjustable screw mounted on an adjusting arm attached to the shaft.

Another object is to provide a gauge support as set forth in the preceding objects wherein the gauge is mounted upon an arm which has a free sliding connection with a vertical shaft which is yieldably resisted by an encircling spring, and which is capable of being locked in position by a clamping device, such as a clamping screw.

Other objects and advantages of the invention will become apparent during the course of the following description of the accompanying drawings, wherein.

Figure 1:
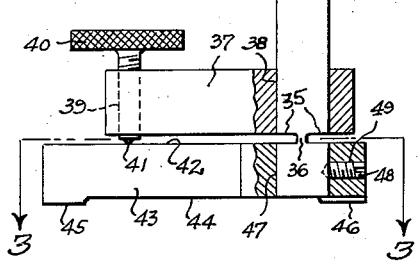
Figure 1 is a side elevation of a gauge support according to a preferred form of the invention, with the base and adjusting arm broken away to show the slender portion of the shaft around which it is tilted as a fulcrum.

Referring to the drawings in detail, Figure 1 shows a gauge support, generally designated 10, according to a preferred form of the invention as adapted to carry a conventional dial indicator gauge, generally designated 11. The dial indicator gauge 11 has the usual body portion 12 with a movable feeler contact 13 at one end and a dial housing 14 with a crystal 15 and needle 16 connected to the feeler contact 13 by the usual mechanism (not shown). The body 12 is also

Figure 5:
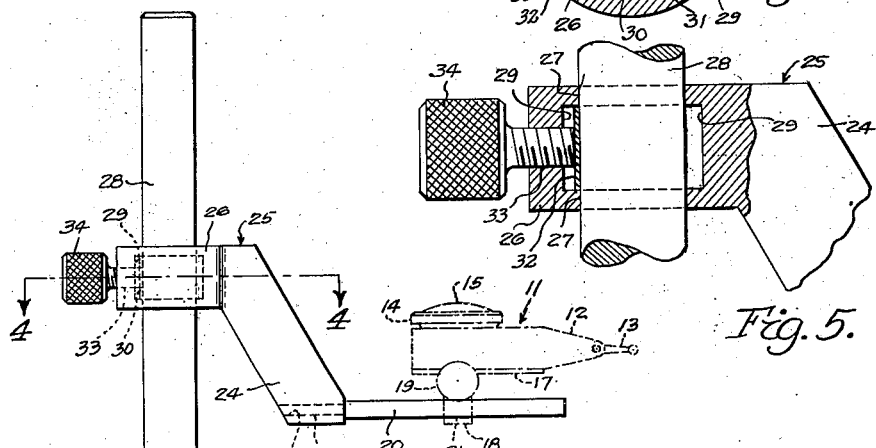
Figure 5 is a vertical section along the line 5—5 in Figure 4.

2 provided with the conventional dovetail bar 17 which enters a dovetail slot (not shown) in the upper portion of a clamping member 18. The latter is provided with a clamping screw 19 which serves to tighten the clamping member 18 about a rod 20 which is received in a bore 21 passing through the clamping member 18. The inner end of the rod 20 is provided with a reduced diameter portion 22 which is mounted in a bore 23 in the lower end of the downwardly angled portion 24 of a gauge-holding arm, generally designated 25. The inclined portion 24 is connected to a sleeve-like hub 26 which has a bore 27 through which a vertical shaft 28 passes (Figure 5).

Figure 2:
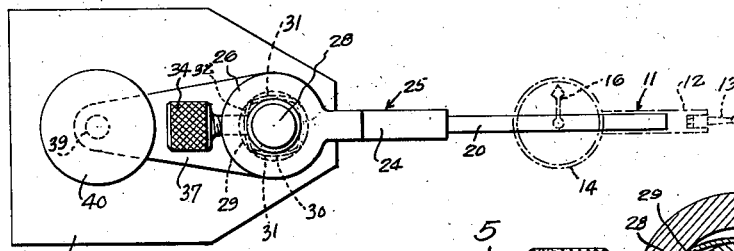
Figure 2 is a top plan view of the gauge support shown in Figure 1.
Figure 4:
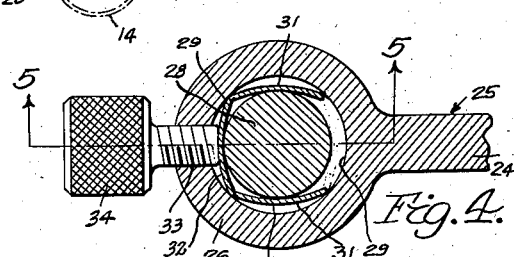
Figure 4 is a horizontal section taken along the line 4—4 in Figure 1, showing the sliding connection between the gauge holding arm and the vertical shaft, together with the encircling spring.

The bore 27 within the hub 26 opens into an enlarged cylindrical cavity 29 which receives an approximately U-shaped detent spring 30 having arcuate sides 31 (Figure 4), joined to one another by an arcuate central portion 32. The hub 26 is also provided with a transverse threaded bore 33 through which passes the threaded stem or shank of a thumb screw 34 by which the hub 26 is positively locked to the shaft 28.

Figure 3:
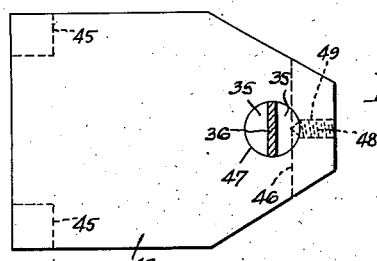
Figure 3 is a horizontal section taken along the line 3—3 in Figure 1, through the slender portion of the shaft.

The shaft 28 near its lower end is provided with a pair of transverse recesses forming slotted portions 35 (Figures 1 and 3) which are cut inward from opposite directions but which terminate short of the center of the shaft 28 in order to provide a slender portion 36 between the two slotted portions 35. Optionally a separate slender spring member may be inserted in a recess in the lower end of the shaft 28 instead of the integral slender portion 36. Mounted on the shaft 28 adjacent the slotted portions 35 is an adjusting arm 37 having a bore 38 for snugly receiving the shaft 28 and a parallel threaded bore 39 into which the threaded shank of an adjusting screw 40 is threaded. The lower end of the adjusting screw 40 is preferably provided with a ball insert 41 for making contact with the top surface 42 of a base 43 having projecting downward from its bottom surface 44 a pair of rearward legs 45 (Figure 3) and a forward leg 46.

The base 43 is in the form of a plate or block having a vertical bore 47 therein for snugly receiving the lower end of the shaft 28 immediately below the slotted portions 35. Thus, the gap between tthe lower surface of the adjusting arm 37 and the upper surface 42 of the base 43 is substantially equal to the width vertically of the slotted portions 35 so that the surfaces of the slotted portions 35 substantially are flush with the adjacent surfaces of the arm 37 and the base 44 respectively. A set screw 48 threaded into a transverse threaded bore 49 leading into the vertical bore 47 serves to lock the lower end of the shaft 28 in the bore 47.

In the operation of the invention, the dial indicator gauge 11 is mounted on the rod 20 of the gauge holding arm 25 in the manner previously described in connection with its construction, and slid along the rod 20 until the feeler contact 13 is positioned at the desired distance from the shaft 28. The clamping screw 19 is then tightened to lock the dial indicator gauge 11 in this position.

The thumb screw 34 is then loosened and the hub 26 moved up and down along the shaft 28 until the feeler contact 13 is at the desired height above the surface on which the feet 45 and 46 of the base rest. While the thumb screw 34 is in its unscrewed position, the U-shaped spring 30 exerts a grip between the shaft 28 and the inner vertical wall of the cavity 29 with a detent action upon the hub 26, holding the latter yieldingly at any point along the shaft 28. When the desired location of the arm 25 along the shaft 28 has been reached, the thumb screw 24 is tightened into the position shown in Figures 4 and 5, positively locking the hub 26 of the arm 25 in its adjusted position.

The arm 25 and the shaft 28 may now be tilted to precisely locate the feeler contact 13 of the dial indicator gauge 11 by turning the head of the adjusting screw 40 in one direction or the other. This action raises or lowers the outer end of the adjusting arm 37 around the slender portion 36 of the shaft 28 as a fulcrum, tilting the shaft 28 around the same fulcrum. The screw 40 and the bore 39 may be provided with fine threads so that the shaft 28 may be very accurately and minutely tilted, thereby positioning the feeler contact 13 of the dial indicator gauge 11 in a most precise manner.

What I claim is:

1. A gauge support comprising a base, an upright secured to said base and having a slender portion therebetween, a dial indicator gauge holder connected to said upright, and adjusting mechanism engaging said upright for tilting said upright relatively to said base around said slender portion as a fulcrum.

2. A gauge support comprising a base, an upright secured to said base and having a slender portion therebetween, a dial indicator gauge holder connected to said upright, and adjusting mechanism including a screw and an arm engaging said upright for tilting said upright relatively to said base around said slender portion as a fulcrum.

3. A gauge support comprising a base, an upright secured to said base and having a slender portion therebetween, a dial indicator gauge holder connected to said upright, an arm connected to said upright and extending outward therefrom, and an adjusting screw disposed between the outer portion of said arm and said base for tilting said upright relatively to said base around said slender portion as a fulcrum.

4. A gauge support comprising a base, an upright secured to said base and having a slender portion therebetween, a dial indicator gauge holder connected to said upright and including a recess extending at least partway around said upright, a resilient member disposed in said recess and yieldingly and slidably engaging said upright, and adjusting mechanism engaging said upright for tilting said upright relatively to said base around said slender portion as a fulcrum.

5. A gauge support comprising a base, an upright secured to said base and having a slender portion therebetween, a dial indicator gauge holder connected to said upright and including a recess extending at least partway around said upright, a resilient member disposed in said recess and yieldingly and slidably engaging said upright, and at least partially encircling said upright, a clamping screw threaded through a portion of said holder into engagement with said resilient member and releasably urging said resilient member into clamping engagement with said upright, and adjusting mechanism engaging said upright for tilting said upright relatively to said base around said slender portion as a fulcrum.

6. A gauge support comprising a base, an upright secured to said base and having a slender portion therebetween, a dial indicator gauge holder connected to said upright and including a recess extending at least partway around said upright, an approximately U-shaped resilient member disposed in said recess and yieldingly and slidably engaging said upright and at least partially encircling said upright, and adjusting mechanism engaging said upright for tilting said upright relatively to said base around said slender portion as a fulcrum.

EDWARD A. SZUBA.

REFERENCES CITED

The following references are of record in the file of this patent:

UNITED STATES PATENTS

| Number | Name | Date |
| --- | --- | --- |
| 1,034,365 | Hauser | July 30, 1912 |
| 1,946,856 | Houston | Feb. 13, 1934 |